July 25, 1967     J. H. LEMELSON     3,332,658

MOLD CONSTRUCTION AND METHOD

Filed Feb. 15, 1965     3 Sheets-Sheet 1

*INVENTOR.*
JEROME H. LEMELSON

July 25, 1967 J. H. LEMELSON 3,332,658
MOLD CONSTRUCTION AND METHOD
Filed Feb. 15, 1965 3 Sheets-Sheet 2

INVENTOR.
JEROME H. LEMELSON

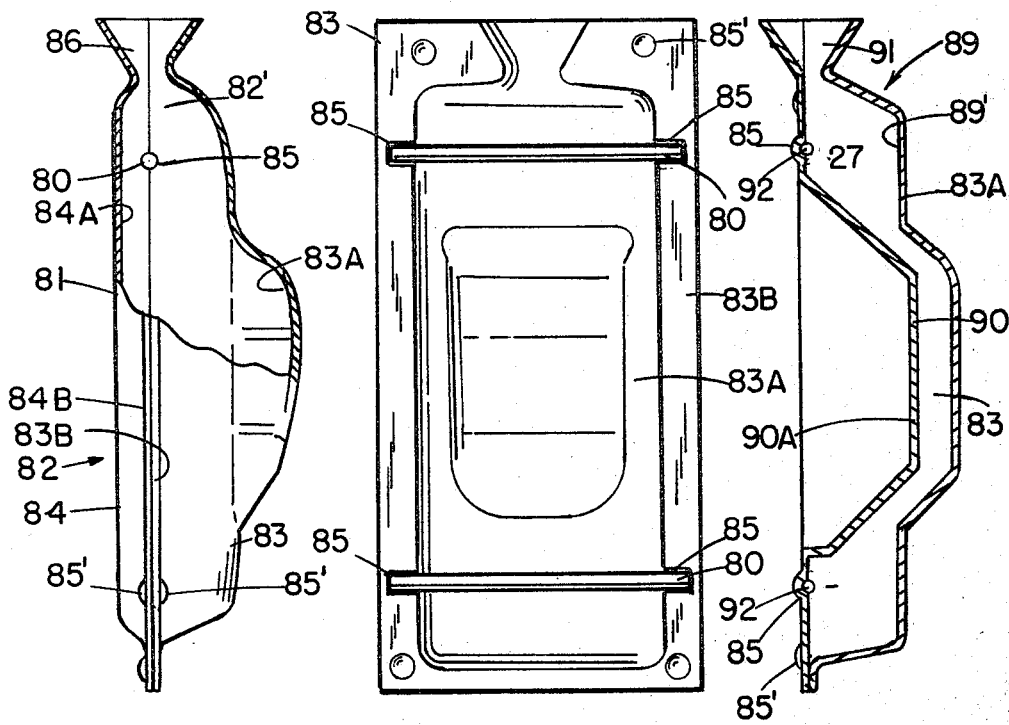
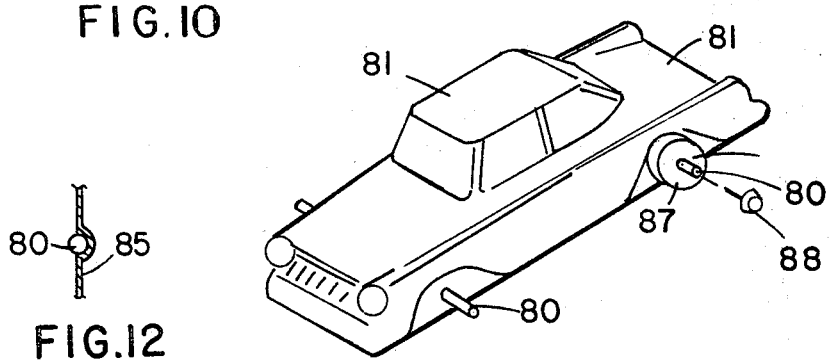

United States Patent Office 3,332,658
Patented July 25, 1967

3,332,658
MOLD CONSTRUCTION AND METHOD
Jerome H. Lemelson, 85 Rector St.,
Metuchen, N.J. 08840
Filed Feb. 15, 1965, Ser. No. 432,504
7 Claims. (Cl. 249—139)

ABSTRACT OF THE DISCLOSURE

This invention is directed to a mold for casting articles from a casting liquid which is settable at room temperatures and which comprises a pair of distinct complementary thin wall members, each being formed of a deformable plastic material and each having complementary planar portions formed with an indentation therein to define a molding cavity wherein the indentation in the respective wall members is wholly disposed within the planar portion thereof and has means for defining an inlet communicating with the molding cavity wherein the complemental planar portions circumscribing the molding cavity are disposed in contiguous abutting relationship in the assembled position of the mold. The wall portions are also provided with complementary aligning means for effecting registration of the respective cavities in the assembled position of the mold and securing means for releasably securing the planar portions of the wall members in abutting relationship to form a seal about the molding cavity.

---

This invention relates in general to molds and mold assemblies and is a continuation-in-part of my copending application Ser. No. 281,306, filed on May 17, 1963, and entitled Molding Technique. In particular this invention relates to a relatively low cost mold which may be advantageously used for forming various shaped figures or articles from comestibles, plaster, and other relatively low temperature settable materials such as wax, plastics, and the like that can readily solidify at ordinary room temperature.

It is an important object of this invention to provide an improved relatively low cost mold which may be used for casting moldable food material such as ice cream, ices, gelatin, and the like into various shaped figures and forms.

Another object is to provide a molding device which can be readily adapted for use as a toy by relatively young children whereby they can mold their own play things such as soldiers, dolls, vehicles, and the like from a relatively low temperature moldable material such as wax and/or a moldable plastic material in a relatively safe and simple manner.

Another object is to provide a molding device which can be readily fabricated from relatively low cost material as by molding, or by pressure or vacuum forming relatively thin sheets of thermoformable sheet material, such as plastics of the type including polystyrene, cellulose acetate, polyvinyl chloride, propionate and the like.

Another object is to provide a low cost molding device in which an article support or axle may be molded in situ within the moldable figure resulting therefrom and serve as a support or means for attaching other members thereto.

The foregoing objects and other features and advantages are attained in one form of the invention by a relatively low cost molding device comprising of a pair of relatively thin walled members formed of thermoformable material having formed therein complementary indentations to define a molding cavity when the pair of members are disposed in continuous abutting relationship. Means are provided on the respective members for insuring accurate registration of the respective indentation thereof to define the molding cavity. A means is also provided to define an inlet through which the molding or casting liquid is poured into the molding cavity so formed. Means are also provided for holding the respective thin walled members in continuous abutting relationship while the moldable liquid is setting within the cavity.

In another form of the invention, the molding cavity may be formed of a single sheet of a thin walled material which has an indentation therein to define the entire molding cavity of the article to be molded. If desired, means are also provided in this form of the invention for molding in situ in a moldable figure, an article which has a portion thereof projecting into the main cavity of the mold so that when the moldable material is poured into the mold and hardens, the article will be retained in the molded figure resulting thereby.

In another form of the invention the molding device may be formed of a pair complementary thin walled members in which complementary indentations are formed to define a molding cavity. In this form of the invention, sub-cavities may be formed for receiving and supporting therein an article which is to be molded in situ in the moldable material from which the figure is molded so that the article thus is connected to the molded figure.

A feature of this invention resides in a relatively simple mold that can be readily fabricated of inexpensive material in a simple and economical manner, and which is positive in operation.

Another feature of this invention resides in the provision of a relatively simple mold which can be reused for an indefinite period of time.

Still another feature of this invention resides in the provision of an improved mold construction in which an article can be readily molded in situ within the moldable material setting in the molding cavity of the mold.

Other features and advantages will become more readily apparent when considered in view of the description and drawings in which:

FIGURE 10 is a side elevation view of another modified mold construction having parts thereof shown in section.

FIGURE 11 is a plan view of one of the mold sections of FIG. 10.

FIGURE 12 is a sectional view taken along line 12—12 of FIG. 11.

FIGURE 13 is a side elevation view of another modified mold construction.

FIGURE 14 is a perspective view of a vehicle figure formed in the mold construction of either FIG. 10 or 13.

Figure 3:
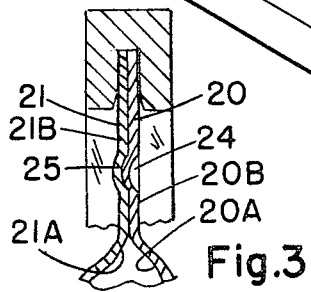
FIGURE 3 is a fragmentary sectional view taken along line 3—3 of FIG. 1.

Referring to the drawings, there are shown several embodiments of a mold construction embodying the instant invention. The mold construction of FIGS. 1 to 3 comprises a pair of complementary thin wall members 20 and 21 shaped to define a molding cavity 22 therebetween, and a holder 23. Preferably, the thin wall members 20 and 21 are formed of a thermoplastic material in which the indentations 20A and 21A are readily formed, as for example, either by a pressure forming or a vacuum forming operation. However, it will be understood that the mold members 20 and 21 may be formed of other thin wall materials such as, for example, foil, paper, sheet metal, or the like. Accordingly, each of the thin wall members 20 and 21 have formed therein complementary indentations 20A and 21A, which in the assembled form define a molding cavity 22 when the planer portions 20B and 21B of the respective thin wall members are disposed in abutting, contiguous relationship as seen in FIGS. 1 and 2.

Figure 1:
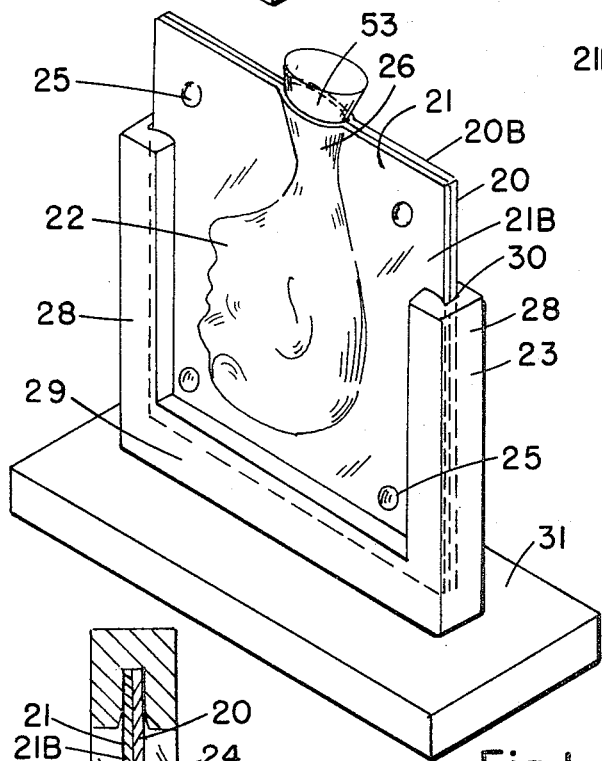
FIGURE 1 is a perspective view of a mold constructed in accordance with the instant invention.
Figure 2:
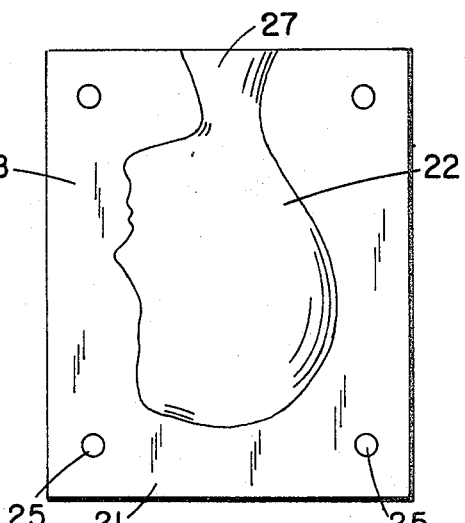
FIGURE 2 is a front view of the mold with the holder therefor removed.

In the illustrated form of the invention of FIGS. 1 and 2, the molding cavity 22 is shaped in the form of a human bust. Each of the respective wall members 20 and 21 are provided with complementary means to effect registration of the indentations of the respective mold members 20 and 21 to insure accurate alignment of the mold indentations in the assembled position of the mold. As best seen in FIG. 1, the registration means comprises complementary dimples 24 and 25 formed in the corner planar portions of the thin wall members 20 and 21. Thus, when the dimples 24 formed in sheet member 20 are disposed in registration with the complementary dimples 25 formed in sheet member 21, the indentations 20A and 21A of the respective mold members are registered to define an accurate molding cavity.

Formed in the respective mold members 20 and 21 is an indentation 26 to define an inlet 27 through which a suitable moldable liquid is poured into the cavity, as for example, a wax, a comestible, such as ice cream, gelatin, ices, and the like, or other suitable relative low temperature settable liquids.

To maintain the respective thin wall members 20, 21 in registration, a holding means 23 is provided. In the form of the invention shown in FIGS. 1 and 3, the holding means comprises a U-shaped holder having opposed upright leg portions 28 interconnected by a bight portion 29. Along the inner edge of the U-shaped portion thus defined, there is provided a groove or slot 30 of sufficient width to accommodate the double thickness of the end wall members 20 and 21 in the assembled position thereof. Accordingly, with the mold assembled as seen in FIG. 1 and held together by holder 23, the moldable material can then be readily poured through the inlet 27 defined by sub-indentations 26. To render the holding means self-supporting, an enlarged base 31 may be connected or formed integral to the bight portion 29 of the holder.

While the illustrated embodiment of FIGS. 1 and 2 discloses the molding cavity in the shape of the human bust, it will be readily understood that the molding cavity may be formed to define any suitable shape or form.

The mold construction described may be readily used as a household appliance for molding such comestibles as gelatin salads, ice cream, ices and the like. Also, the mold device described may be rendered readily applicable for use as a toy by young children. When used as a toy, a child may form his own play things from relatively low temperature setting materials such as plaster, certain plastics, waxes and the like. The playthings which can be readily be molded may comprise cars, airplanes, boats, ships, tanks, soldiers, dolls, and the like, with which a child may amuse himself after he has formed the same.

Figure 4:
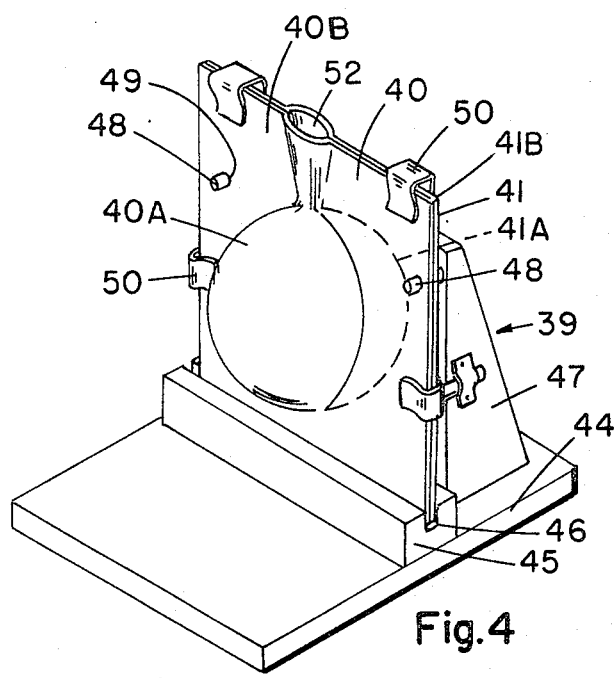
FIGURE 4 is a perspective view of a modified form of the invention.
Figure 5:
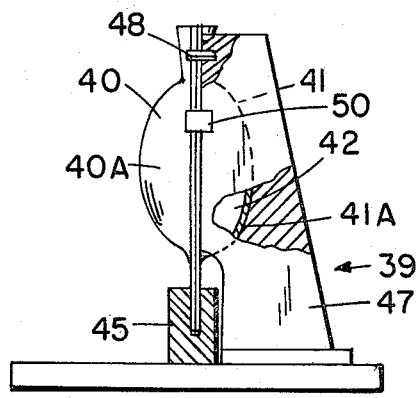
FIGURE 5 is an end view of the embodiment of FIG. 4 with portions thereof shown in section.

FIGS. 4 and 5 illustrate a slightly modified form of the invention. In this form of the invention, mold 39 comprises a pair of thin wall members 40 and 41 each formed with complementary indentations 40A and 41A to define in the assembled position thereof a molding cavity 42 as hereinbefore described. As shown, the holder 43 for supporting the respective mold members 40 and 41 in contiguous abutting relationship comprises a base member 44 on which a bar 45 extends transversely thereof. The bar 45 is formed with a groove 46 and is sized to accommodate or receive the bottom peripheral edge portion of the assembled mold members 40 and 41. An upright support 47 is connected to the base member 44, and it is provided with projecting pins 48 which are adapted to extend through openings 49 formed in the planer portion 40B and 41B of the respective mold members 40 and 41. The arrangement is such that projection of the pins 48 through the openings 49 effect registration of the complementary indentations of the mold members 40 and 41 in the assembled position thereof.

Suitable clamp means 50 are connected to the support 47 for maintaining the side and upper peripheral portions of the mold members 40 and 41 in contiguous abutting relationship in the assembled position.

In the form illustrated in FIGS. 4 and 5, the complementary indentations defined in the assembled form a substantially spherical form. Connected in communication with the interior of the molding cavity defined by mold members 40 and 41 is an inlet 52 through which the moldable material is poured into the cavity.

Figure 6:
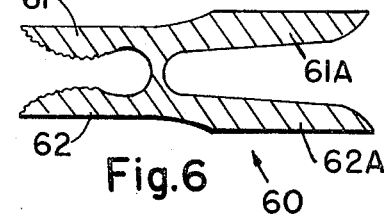
FIGURE 6 is a cross sectional view of a modified holder means.

FIG. 6 illustrates a modified form of holder 60. As shown, the holder of FIG. 6 comprises simply an integrally formed plastic clip which is substantially H-shaped in cross section. The gripper portion of the clip is defined by spaced jaw portions 61 and 62 which are serrated along the inner edge thereof to assure positive gripping action. An arrangement of the clip is such that the inherent resiliency and memory of the material from which it is formed tends to bias the jaw members 61 and 62 toward their closing or gripping positions. Thus, a force exerted on the other ends 61A and 62A of the clip will cause the jaws portions 61 and 62 to spread toward an opening position. Thus it will be readily apparent that by utilizing several of the clips, as described, in circumferentially spaced relationship about the planer portion of the mold construction, as described with reference to FIGS. 1 to 3 or 4 and 5, can be utilized to secure the respective mold members thereof together.

Figure 7:
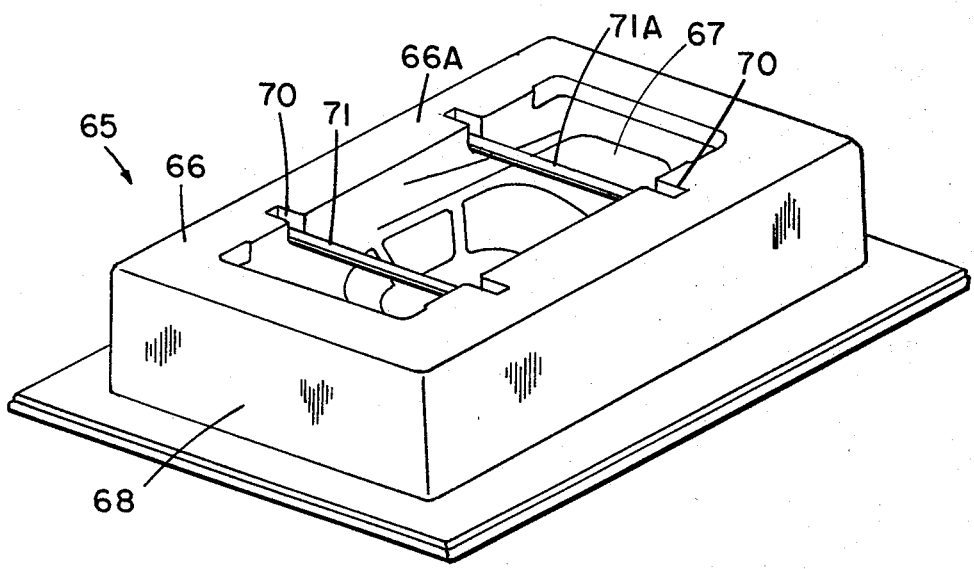
FIGURE 7 is a perspective view of another modified form of the invention.
Figure 8:
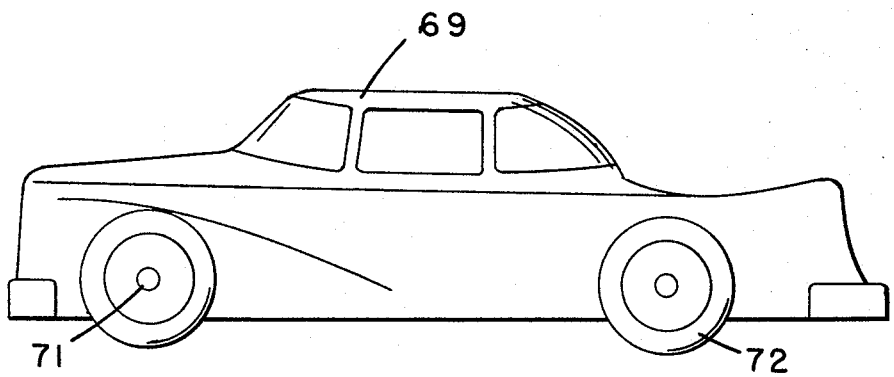
FIGURE 8 is a side view of a figure formed from the molding device of FIG. 7.

FIGURE 7 illustrates a modified form of the invention. In this form of the invention, the mold 65 is defined by a single sheet of thin wall material 66. In the illustrated embodiment of FIG. 7, the thin wall material 66 is defined by a planar portion 66a in which a molding cavity 67 is formed. Connected to the peripheral edge of the planar portion 66A is a circumscribing depending wall 68 to space the planer portion 66A from a supporting surface. Accordingly, the mold 65 of FIG. 7 may be readily formed either by vacuum forming or pressure forming.

In the illustrated embodiment of FIG. 7, cavity 67 is shaped to define the exterior portion of an automobile or vehicle 69. Formed integral with the main cavity 67 of the mold, there is formed a plurality of laterally extending sub-cavities 70 adjacent either end of the main cavity. The sub-cavities 70 define a recess for retaining therein an article, which in the illustrated embodiment comprises a rod 71, which is to function as the axle of the vehicle to be molded. Accordingly, as shown in FIG. 7, the article or rod forming the axle has its end portions supported in the opposed sub-cavities 70 with the intermediate portion 71A extending across the main cavity 67. The axle 71 resting in cavities 70 is spaced from the top 66A of the mold 65 by the depth of the sub-cavity and may also comprice means for rotating the article molded thereon or otherwise supporting same.

To form the article, a molding or casting material is poured directly into the cavity 67 until the level of the molding liquid is substantially flush with the top planer surface 66A of the mold whereby the intermediate part of the rod or axle is submerged below the level of the moldable material. When the material has set, the rod or axle 71 is embedded in situ within the moldable or settable material. After the material has set, and the article formed is removed from the mold, wheels 72 may then be rotatably journaled on the extended end portions of the axles so that the figure of the vehicle may be completed.

Figure 9:
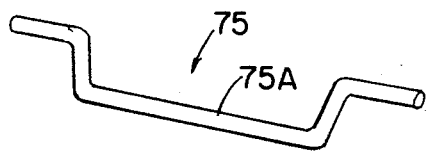
FIGURE 9 is a detailed view of a modified axle construction for use in FIG. 7 for use in a figure constructed from the mold of FIG. 7.

In FIG. 9, a modified axle construction 75 is shown. In this form of the invention, the axle 75 is provided with a U-shaped configuration 75A intermediate the ends thereof. Accordingly, with the construction of the axle shown in FIG. 9, the intermediate portion 75A thereof is thus offset so that is will extend deeper within the body of the cavity 67 of mold 65 when such axle construction is employed.

FIGS. 10 and 11 illustrate a further modified mold construction comprising an assembly 82 in which the axle 80 of a vehicle 81 may be molded directly into the body of the vehicle. As shown, the mold 82 is defined by a pair of thin wall sheet members 83 and 84, preferably formed of a suitable plastic material. Each has formed therein complementary indentations 83A and 84A which may be formed by vacuum or pressure forming. One of the mold members 83 has an indentation 83A which defines an upper portion of a vehicle to be formed and the indentation thereof is circumscribed by a substantially rectangular planer portion 83B. Extending laterally adjacent the front and rear ends of the main indentation 83A, are a pair of opposed axially aligned laterally extending sub-cavities 85 in which the article or axle 80 is adapted to be positioned. Since the sub-cavities 85 are formed in the planer portion of the mold member 83 that circumscribes the molding cavity 83A, the rods or axles supported therein are disposed below the plane of the planer marginal portion that circumscribes the cavity 83A. The complementary mold portion 84, formed of a thin wall sheet material, has formed therein a relatively shallow indentation 84A to define the under portion of the vehicle to be formed. Surrounding the indentation 84A of member 84 is a planar portion 84B adapted to be disposed in contiguous relationship with the planar portion of the mold member 83 in the assembled position of the mold. When the respective complementary thin wall members 83 and 84 are assembled and respective planer marginal portions thereof are disposed in contiguous relationship, the rods or axles 80 are held captive therebetween in the sub-cavity across the molding cavity 82'.

Means in the form of complementary dimples 85' as hereinbefore described are provided in the corner portions of the mold members 83, 84 to place the respective indentations 83A and 84A into registration.

The respective mold members 83 and 84 in turn are maintained in registration by any of the suitable holding means hereinbefore described. Thus, when a material is poured into the cavity through the inlet 86 defined by the mold members, the material will flow around the axles 80 held captive between the mold members 83, 84. Thus, after the material has set, the respective mold members are readily separated in the removal thereof from the holders, and the axles trapped between them are embedded in the article molded.

Wheels 87 may then be rotatably attached to the extended ends of the axle 80 by means of a fastener 88, the latter shaped to simulate the hub of a wheel as shown in FIG. 14. Accordingly, when used as a toy, young children can mold and build their own toys in a relatively simple and inexpensive manner.

FIGURE 13 illustrates another form of mold construction for forming a vehicle or other suitable shape. In this form, the mold assembly 89 comprises molding members 83 and 90, each being provided with complementary molding indentations 83A and 90A. In this form of the invention, the respective indentations 83A and 90A are concave in the same direction so as to nest in the assembled position the respective mold member 83 and 90. Thus, the mold defines an external shell or shape of a figure to be formed, thus requiring only a minimum of moldable material to be used to define the molded article. For all practical purposes, member 83 of FIG. 13 is substantially similar to that hereinbefore described with reference to FIGS. 10 and 11, i.e., it is provided with sub-indentations 85 formed in planer portion which circumscribes the main indentation 83A. The respective complementary members 83, 90 are also formed so that the respective indentations 83A and 90A when nested retain an axle in proper position therebetween as indicated in FIG. 13. The spacing between the respective indentations 83A and 90A of the thin wall members 83 and 90 are connected into communication with an inlet 91 through which the moldable material is poured. Accordingly, axles 92 are readily molded in situ within the mold when material sets. When the respective thin wall members 83 and 90 are separated the axles are then embedded in the cast articles. The end portions of axles that extend beyond the outline of the figures are then fitted with wheels to complete the vehicle so cast.

From the foregoing it will be noted that cavities defined by the respective molds herein described may be shaped to assume any desired configuration or form. Also the type of moldable material which is poured into the respective mold may vary depending upon the use or application of the mold. The instant invention contemplates that articles may be molded in situ within the molded figure resulting thereby so that, as for example, in the case of forming a molded plaque or the like, a supporting hook or holder may be molded in situ therein. In the case of molding comestibles, such as ice cream, ice and the like, a stick by which the same may be held may be molded thereinto; or when used in toy making, the axles of vehicles as herein described.

While the instant invention has been described with reference to a particular embodiment thereof it will be appreciated and understood that variations and modifications thereof may be made without departing from the spirit or scope of the instant invention.

What is claimed is:
1. A mold for casting articles of a casting liquid comprising,
    (a) a pair of relatively thin wall members formed of a thermoformable plastic material contiguously disposed,
    (b) said wall members being formed to define therebetween a molding cavity having an inlet disposed in communication therewith through which the moldable material is poured,
    (c) means for aligning said complementary wall members to insure registration of said wall members,
    (d) a holder for maintaining said complementary wall members in registration, and
    (e) said holder comprising a substantially U-shaped member having a base portion and opposed upright leg portions, said U-shape member having a slot formed therein for slidably receiving the contiguous peripheral edge portions of said wall members.
2. The invention as defined in claim 1 wherein said planar portion of said wall members has formed therein a channel-like sub-indentation projecting outwardly from said molding cavity thereof,
    and an article to be cast in said mold,
    said article being shaped whereby part of said article is received and supported in said sub-indentation with a part of said article projecting into the volume defined by said molding cavity so that when a casting liquid is poured into said molding cavity and fills said cavity, the part of said article extending into said cavity will be molded into said liquid upon setting of the same.
3. A mold for casting articles of a casting liquid settable at room temperature comprising:
    a pair of separate, distinct, disconnected complementary thin wall members, each being formed of a deformable plastic material, and
    each of said members having complementary planar portions formed with an indentation therein to define a molding cavity, the indentation in each sheet being wholly disposed within the planar portion of its respective thin wall member, means defining an inlet opening communicating with said molding cavity, the complementary planar portion circumscribing the molding cavity of the respective wall members being disposed in abutting relationship in the assembled position of said mold, complementary aligning means formed in the planar portions of the respective wall members to insure the registration of the respective cavities thereof when the planar portions of said wall members are disposed in contiguous abutting relationship, securing means for releasably securing said planar portions of said wall members in abutting relationship to form a seal about said molding cavity, said securing means frictionally maintaining said planar portions together by clamping adjacent edges of said wall members.

4. A mold for casting an article from a relatively low temperature casting liquid comprising,
 (a) a pair of relatively thin wall members formed of a thermoformable plastic material,
 (b) said wall members being formed to define therebetween a molding cavity simulating a figure and an inlet disposed in communication with said cavity through which the moldable material is poured whereby said inlet opening is shaped to define a supporting base for said figure,
 (c) means for aligning said complementary wall members to insure registration therebetween,
 (d) a holder for maintaining said complementary wall members in registration,
 (e) said holder comprising a substantially U-shaped member having upright leg portions, said U-shape member having a slot formed therein for slidably receiving the peripheral edge of said wall members,
 (f) and a relative wide base connected to said U-shaped members whereby said base portion defines a support for said holder to maintain said thin wall members in proper position as said casting liquid solidifies in said mold.

5. A mold for casting articles of a casting liquid settable at room temperature comprising,
 (a) a pair of complementary thin wall members formed of a thermoformable plastic material,
 (b) each of said members having a planar portion formed with an indentation therein to define a molding cavity, the indentation in each sheet being wholly disposed within the planar portion of its respective thin wall member,
 (c) complementary aligning means formed in the planar portion of the respective wall members to insure the registration of the respective cavities thereof when the planar portions of said wall members are disposed in contiguous abutting relationship,
 (d) means defining an inlet communicating with said molding cavity,
 (e) a holder for maintaining said thin wall members in contiguous relationship,
 (f) said holder comprising a U-shaped frame having a base portion and a pair of opposed leg portions,
 (g) said base portion having a width sufficient to render the said holder self supporting, and said frame having a continuous slot extending along the inner edge of said leg portions and base portion,
 (h) and said slot having a width sufficient to slidably receive therein the peripheral edges of the aligned thin wall members.

6. The invention as defined in claim 5 wherein the indentations formed in said wall members are oppositely concaved in the assembled position thereof.

7. The invention as defined in claim 5 wherein the indentations formed in said wall member are concaved in the same direction in the assembled position thereof.

References Cited
UNITED STATES PATENTS

| | | | |
|---|---|---|---|
| 2,124,871 | 7/1938 | Beal | 18—39 X |
| 2,352,083 | 6/1944 | Detzen. | |
| 2,466,276 | 3/1949 | Ryder | 18—36 |
| 2,658,237 | 11/1953 | Cuppett et al. | |
| 2,660,776 | 12/1953 | Miller | 18—39 X |
| 2,684,503 | 7/1954 | Silver. | |
| 2,839,788 | 6/1958 | Dembiak | 18—42 X |
| 2,941,258 | 6/1960 | Riley | 249—90 X |
| 2,978,244 | 4/1961 | Rempel et al. | |
| 3,137,894 | 6/1964 | Butler et al. | 18—42 X |

WILLIAM J. STEPHENSON, *Primary Examiner.*